(12) United States Patent
Williams et al.

(10) Patent No.: US 9,135,379 B2
(45) Date of Patent: Sep. 15, 2015

(54) SYSTEMS AND METHODS FOR MULTI-ZONAL ANALYSIS OF PHYSICAL OBJECTS

(71) Applicant: SAS IP, Cheyenne, WY (US)

(72) Inventors: Dan Williams, Kitchener (CA); Phil Zwart, St. Agatha (CA); Davor Cokljat, Sheffield (GB); Michael Engelman, West Lebanon, NH (US)

(73) Assignee: SAS IP, Inc., Cheyenne, WY (US)

( * ) Notice: Subject to any disclaimer, the term of this patent is extended or adjusted under 35 U.S.C. 154(b) by 0 days.

(21) Appl. No.: 14/210,940

(22) Filed: Mar. 14, 2014

(65) Prior Publication Data

US 2014/0303948 A1    Oct. 9, 2014

Related U.S. Application Data

(60) Provisional application No. 61/794,563, filed on Mar. 15, 2013.

(51) Int. Cl.
*G06F 17/50* (2006.01)

(52) U.S. Cl.
CPC ........ *G06F 17/5009* (2013.01); *G06F 17/5018* (2013.01); *G06F 2217/16* (2013.01)

(58) Field of Classification Search
USPC ......................... 703/2, 7, 9; 702/45
See application file for complete search history.

(56) References Cited

U.S. PATENT DOCUMENTS

| | | | |
|---|---|---|---|
| 7,785,098 B1* | 8/2010 | Appleby et al. | 425/470 |
| 7,893,413 B1* | 2/2011 | Appleby et al. | 250/505.1 |
| 8,011,583 B2* | 9/2011 | Lei et al. | 235/438 |
| 8,049,193 B1* | 11/2011 | Appleby et al. | 250/505.1 |
| 2007/0136008 A1 | 6/2007 | Liu et al. | |
| 2009/0083705 A1* | 3/2009 | Phillips et al. | 717/113 |
| 2012/0232860 A1 | 9/2012 | Rodriguez et al. | |
| 2012/0245910 A1 | 9/2012 | Rajnarayan et al. | |
| 2012/0303339 A1 | 11/2012 | Cruz | |

OTHER PUBLICATIONS

Notification of Transmittal of the International Search Report and the Written Opinion of the International Searching Authority dated Aug. 11, 2014 from related/corresponding PCT/US2014/027562.

* cited by examiner

*Primary Examiner* — Thai Phan
(74) *Attorney, Agent, or Firm* — Jones Day

(57) ABSTRACT

A multi-zonal analysis processor-implemented system is provided for analyzing physical behavior of a multi-zonal physical object. Candidate multi-zonal engineering models, solution methods, and parameters associated with the engineering models and solution methods are selected for use in analyzing different zones of the physical object.

72 Claims, 11 Drawing Sheets

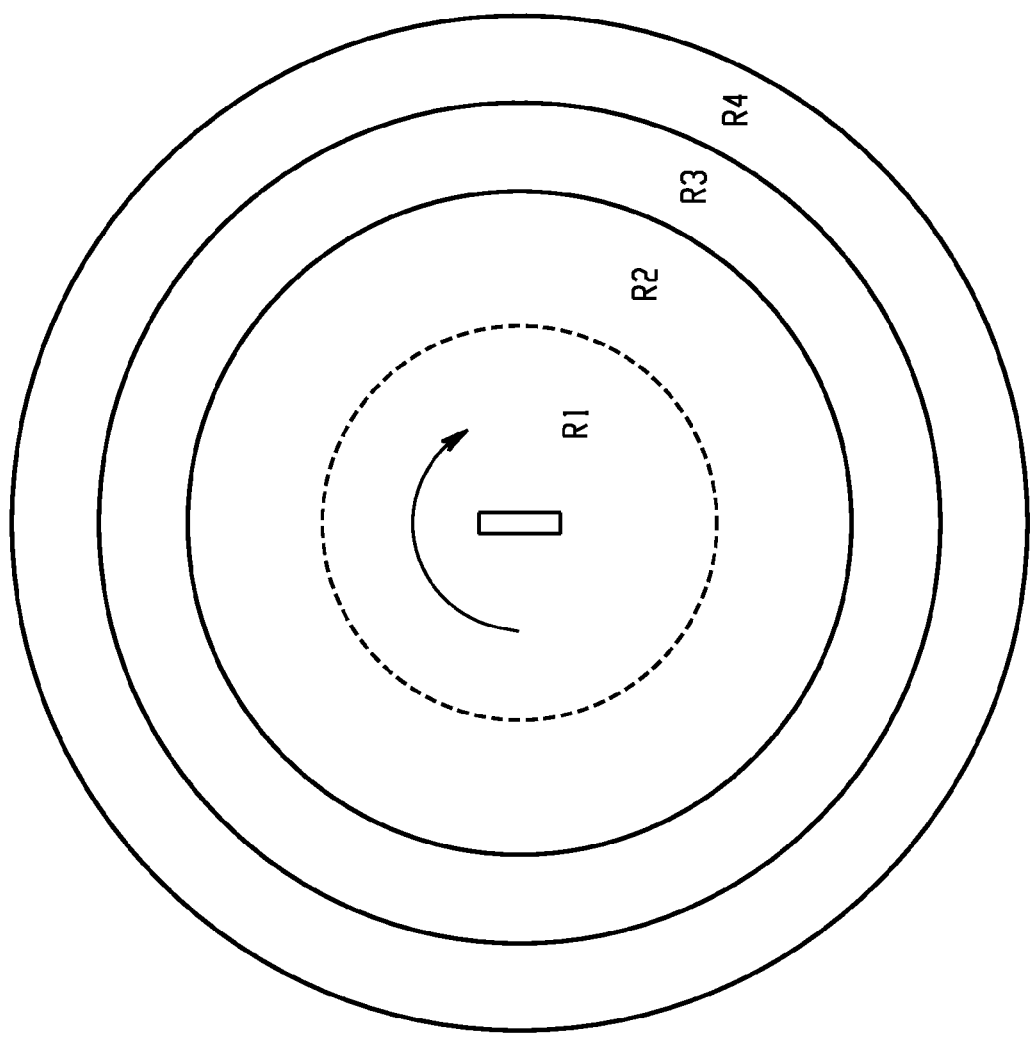

SYSTEMS AND METHODS FOR MULTI-ZONAL ANALYSIS OF PHYSICAL OBJECTS

PRIORITY

This application claims the benefit under 35 U.S.C. §119 (e) of the earlier filing date of U.S. Provisional Patent Application No. 61/794,563 filed on Mar. 15, 2013, the contents of which is hereby incorporated by reference.

TECHNICAL FIELD

The present disclosure relates generally to the field of computational simulation involving physical objects, and, more specifically, to processor-implemented systems and methods for multi-zonal analysis of physical objects.

BACKGROUND

Computational simulations are playing an increasing important role in the development of many products. Simulations can be used for many purposes, including the analysis and prediction of fluid flows and heat transfer using computational models. Usually, a numerical model of a structure around or through which flows are occurring is constructed. The resulting flow information is converted to an output form, e.g., a graphical representation showing the flow paths and depicting analysis of physical behavior associated with a physical object.

SUMMARY

As disclosed herein, processor-implemented systems and methods are provided for multi-zonal analysis of physical objects. For example, multi-zonal analysis systems and methods are provided for analyzing physical behavior of a multi-zonal physical object, and allowing for any choice of model or solution method per zone, such as for a fluid or solid field to be simulated or analyzed.

As another example, a multi-zonal analysis processor-implemented system is provided for analyzing physical behavior of a multi-zonal physical object. The system includes: a non-transitory computer-readable storage medium and one or more data processors. The non-transitory computer-readable storage medium is configured to store candidate multi-zonal engineering models, solution methods, and parameters associated with the engineering models and solution methods. The multi-zonal physical object is divided into multiple zones based upon a common physical characteristic. The one or more data processors are configured to: provide the stored candidate multi-zonal engineering models, solution methods, and associated parameters for selection and use in analyzing any of the zones with respect to the physical behavior of the multi-zonal physical object; generate physical results data for the zones using the selected models, solution methods, and associated parameters; and store the generated physical results data for use in analyzing the physical behavior of the multi-zonal physical object.

BRIEF DESCRIPTION OF THE DRAWINGS

FIG. 3 depicts an example diagram of a multi-zonal physical object.

DETAILED DESCRIPTION

Figure 1:
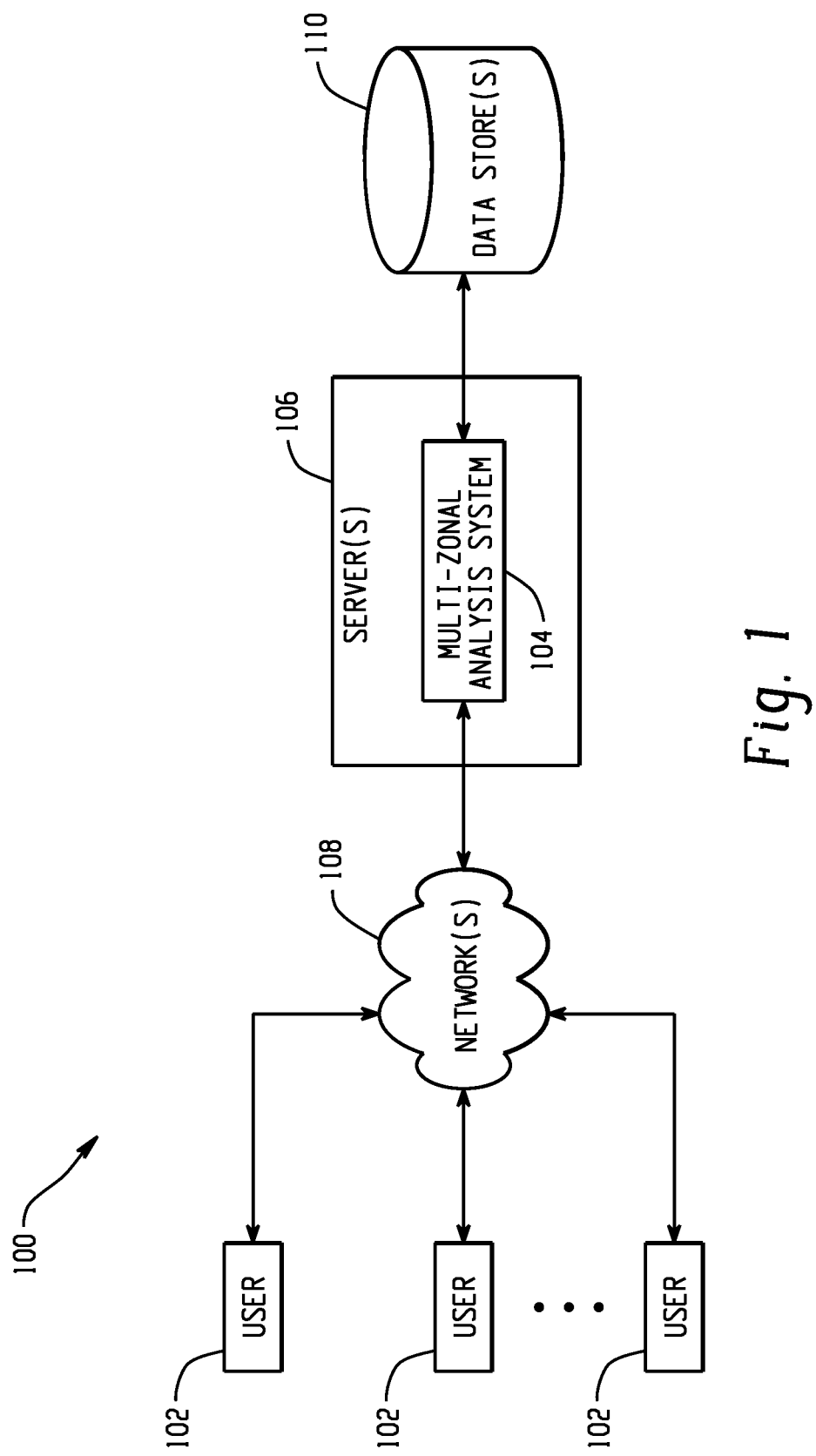
FIG. 1 depicts a computer-implemented environment wherein users can interact with a multi-zonal analysis system hosted on one or more servers through a network.

FIG. 1 depicts a computer-implemented environment wherein users 102 can interact with a multi-zonal analysis system 104 hosted on one or more servers 106 through a network 108. The multi-zonal analysis system 104 can assist the users 102 to simulate or analyze a physical object, such as a cold combustor, heat exchanger, or car engine, with respect to one or more physical characteristics. More specifically, the multi-zonal analysis system 104 can analyze different zones (e.g., regions) that exist within the physical object. The different zones may arise because of differing phases, fluid dynamic zones (e.g., turbulent zones vs. laminar flow zones), heat transfer zones, etc. The multi-zonal analysis system 104 can simulate and analyze the physical characteristics of any of the zones of the physical object using multi-zonal engineering models, solution methods, and associated parameters. This allows for the choice of any model, solution method (e.g., discretization methods) or associated features/parameters per zone of the physical object to be simulated or analyzed. For example, the multi-zonal analysis system 104 can be configured to provide a heat, or energy, transfer solution in both fluid and solid zones, and vary material models per fluid and solid zone based upon such parameters as the physical properties of the fluids.

As shown in FIG. 1, the users 102 can interact with the multi-zonal analysis system 104 through a number of ways, such as over one or more networks 108. One or more servers 106 accessible through the network(s) 108 can host the multi-zonal analysis system 104. The one or more servers 106 can also contain or have access to one or more data stores 110 for storing data for the multi-zonal analysis system 104.

Figure 2A:
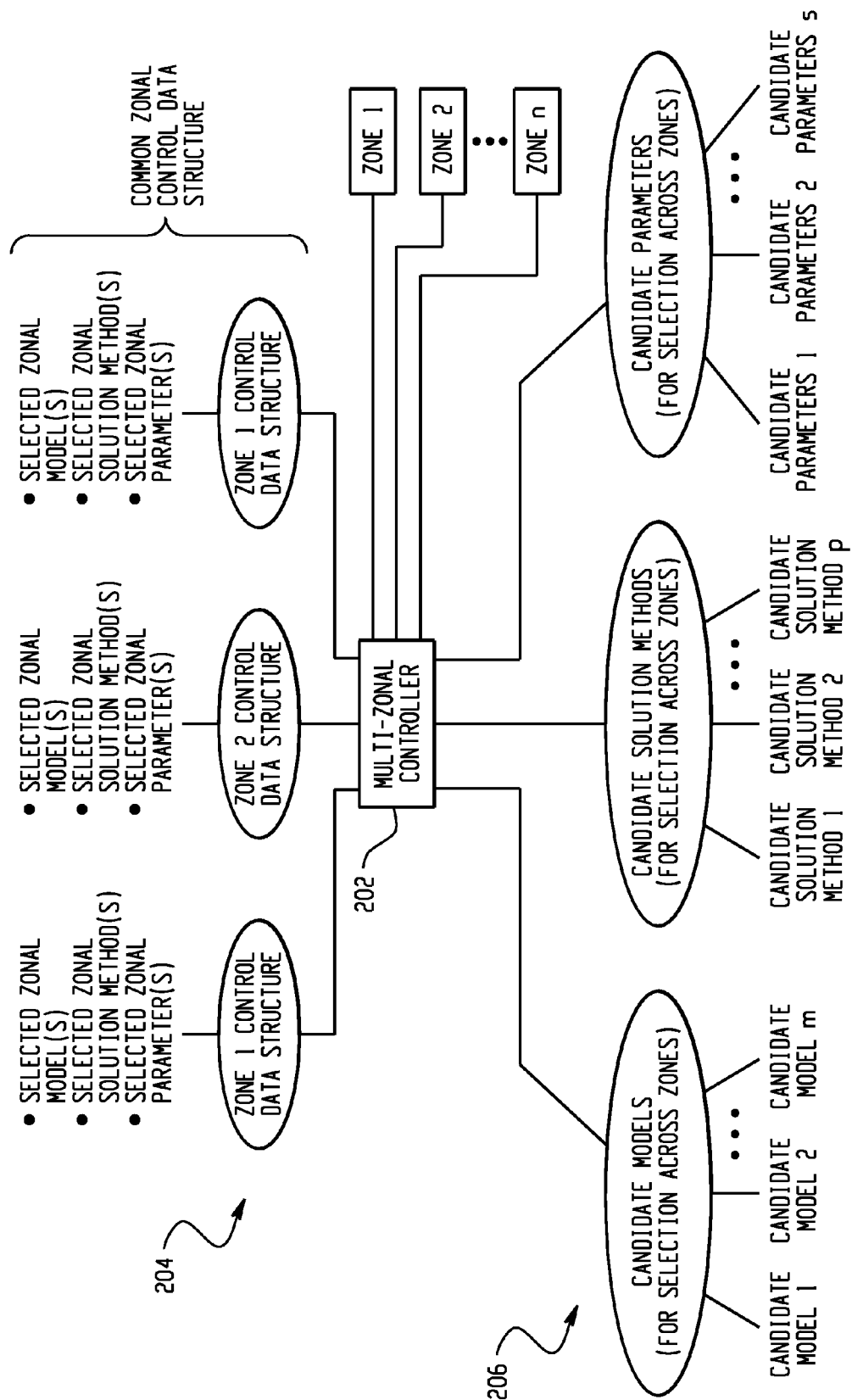
FIGS. 2A-2D depict examples of a configuration of software components for performing multi-zonal analysis of a physical object.

FIG. 2A depicts an example of software components performing multi-zonal analysis of a physical object using the multi-zonal analysis system 104. A multi-zonal controller 202 of the multi-zonal analysis system 104 is configured to divide the multi-zonal physical object into multiple zones based upon a common physical characteristic to be analyzed and then simulate the physical behavior of the physical object in different zones using the selected models, solution methods and associated parameters.

More specifically, the multi-zonal controller 202 divides the physical object into multiple zones Zone 1, Zone 2, ..., Zone n, where n is a positive integer based at least in part on certain zonal data for different zones of the physical object. The model(s), solution method(s), and associated parameter(s) to be used in simulating or analyzing each zone are stored in zone control data structures 204. The zonal control data structures 204 can be populated in the following manner.

Figure 2B:
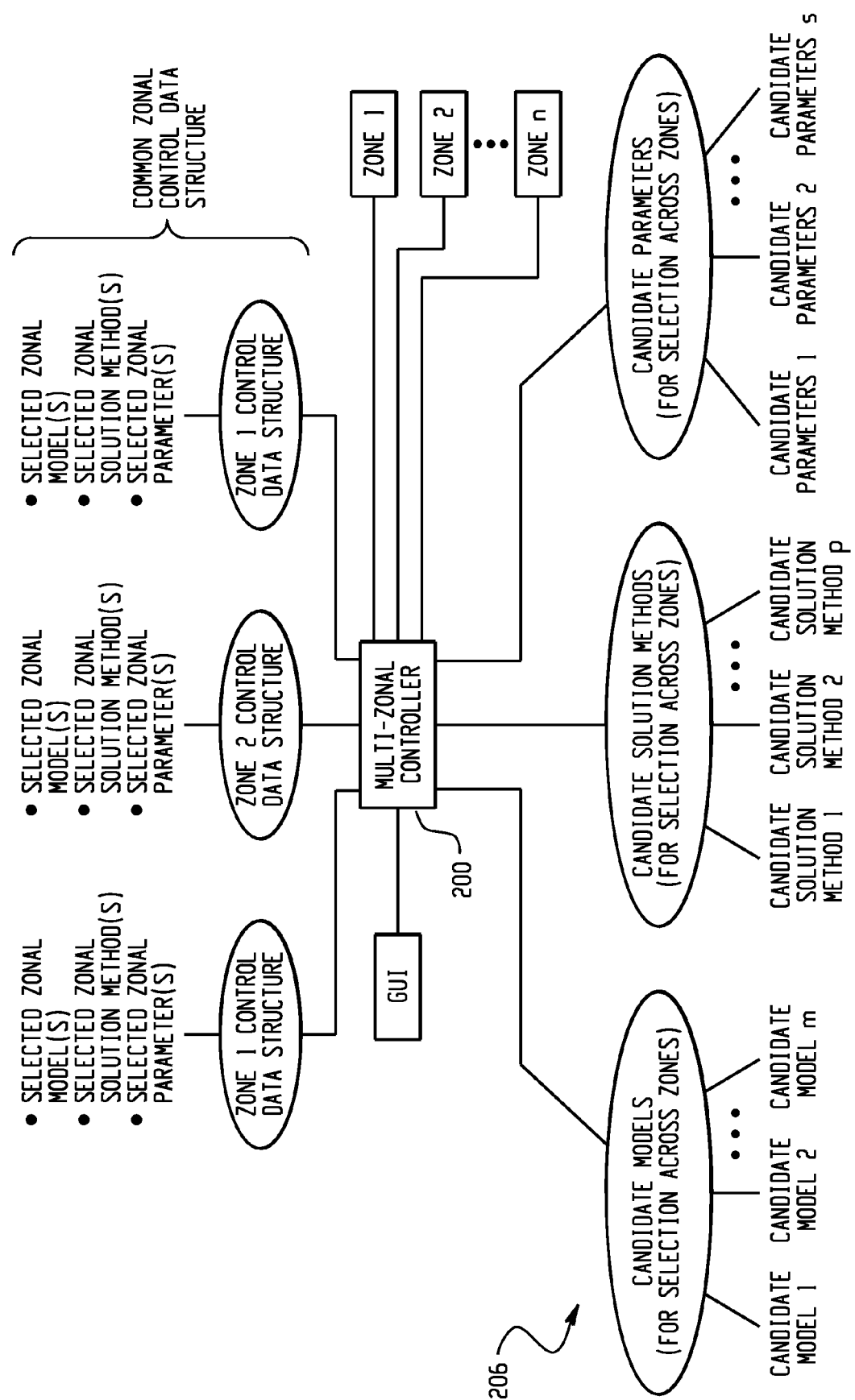
Figure 2C:
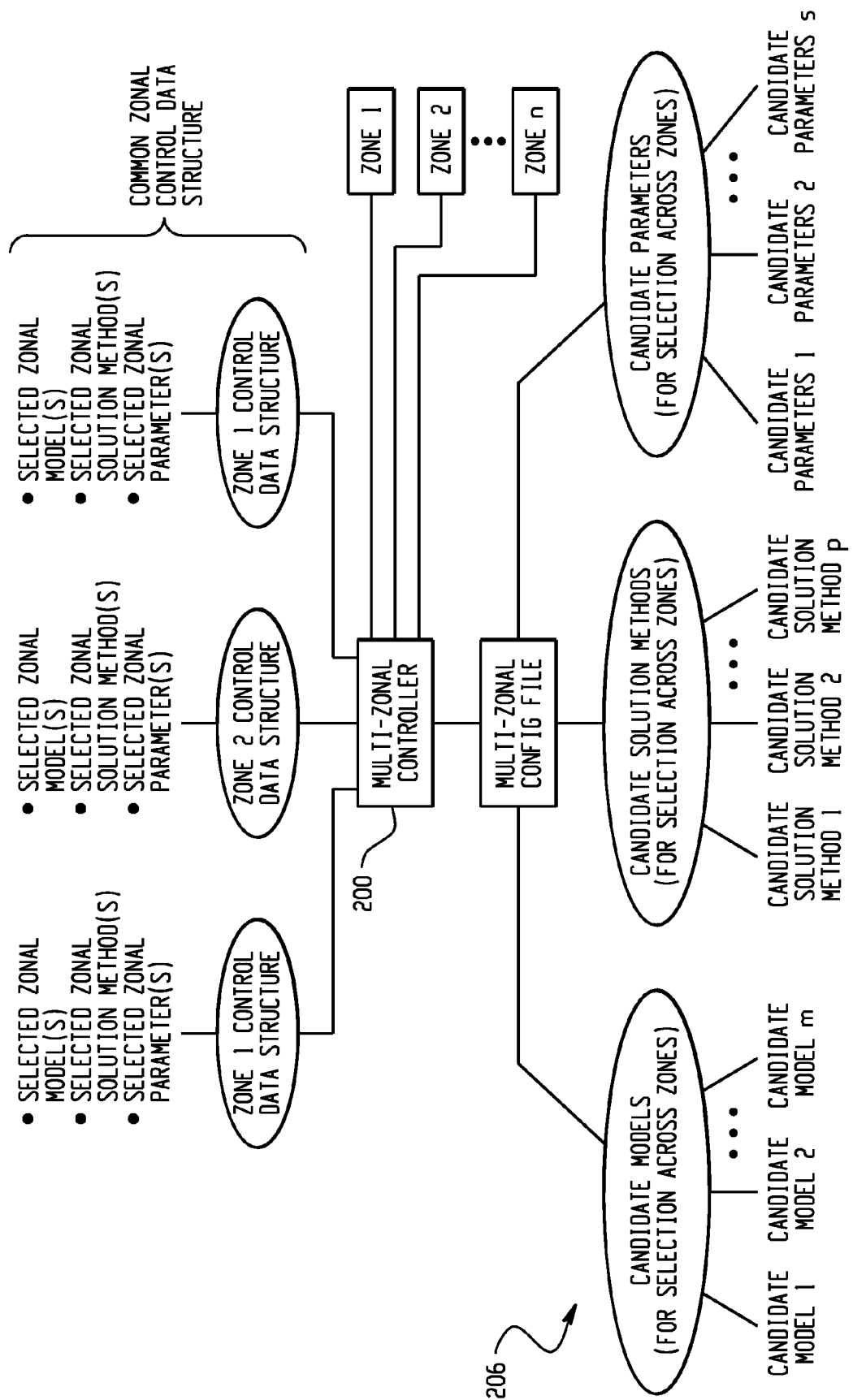

The multi-zonal controller 202 receives selection per zone of one or more candidate models for simulation and analysis of the physical object, one or more candidate solution methods, as well as one or more candidate parameters (e.g., across all zones) including discretization methods. The selection of models, solution methods, and parameters can be through user selection via a GUI as shown in FIG. 2B or in a batch type mode as shown in FIG. 2C. The system can be configured to use either or both approaches shown in FIGS. 2B and 2C.

It should be further understood that selection of a model for a particular zone may automatically select solution methods and parameters for operation with that model. In this manner, the user indirectly selects the solution methods and parameters when the user directly selects a model for a particular zone.

Figure 2D:
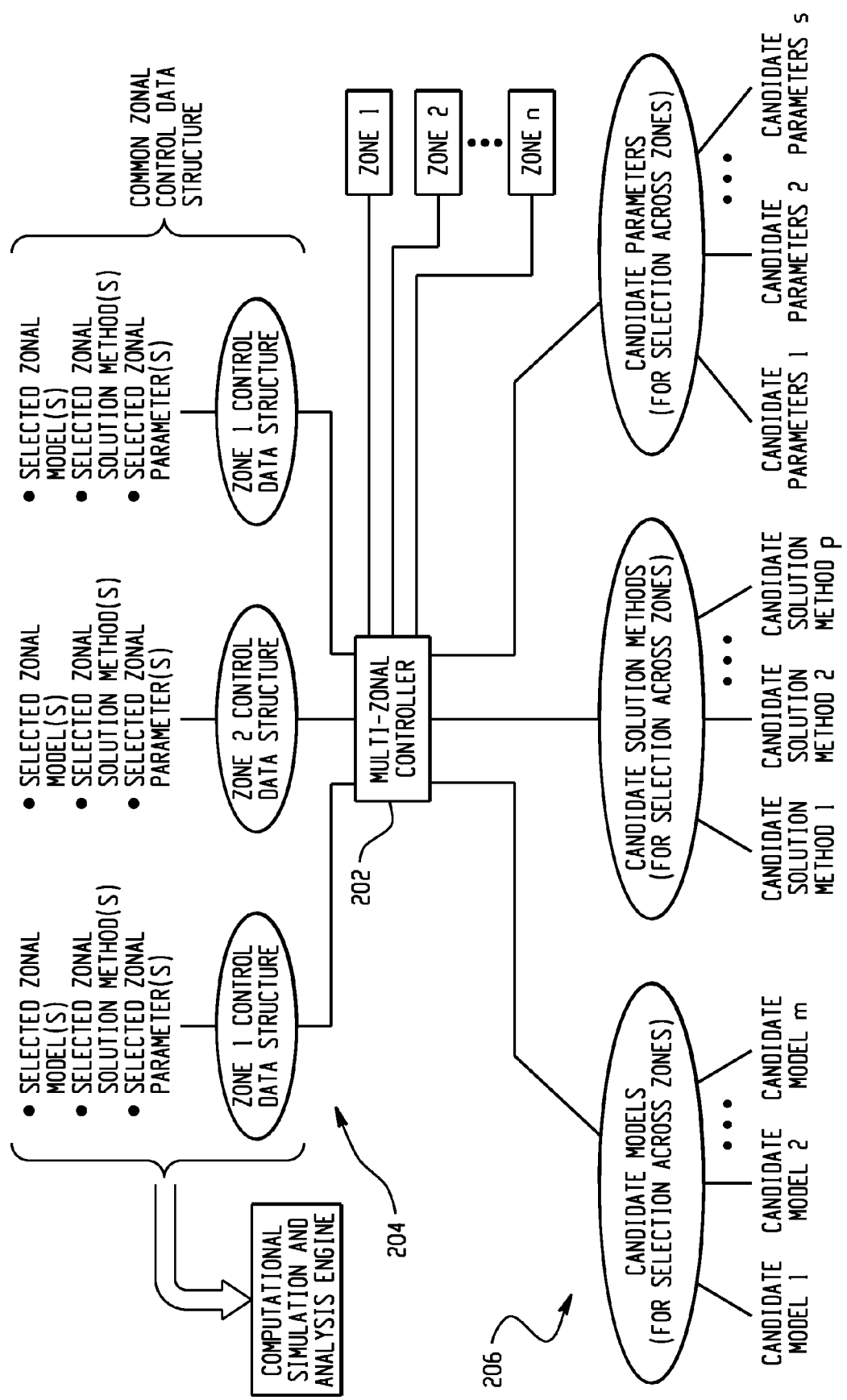

FIG. 2D depicts that a computational simulation and analysis engine uses the zonal control data structures 204 to simulate and analyze the different zones of the physical objects. The output of the engine can be in many different forms, such as output data files, graphical representations of the simulated results, etc. For example, the multi-zonal analysis system 104 may perform post processing using as many data interfaces as there are solution methods and communicate with solution data interfaces to construct a post processing geometry for display to the user.

The multi-zonal analysis system 104 can be configured in many different ways, such as allowing the varying of: the gradient method per zone (e.g., for disconnected zones and spatially-coupled zones), the relaxation approaches per zone, and the discretization of convection, diffusion and other surface based flux terms in each solved equations on a per-zone basis. For example, the multi-zonal analysis system 104 is configured to implement different spatial discretization schemes, such as control volume finite elements and Finite elements.

The multi-zonal analysis system 104 can also be configured to run different solution methods or algorithms in different zones. For example, to accelerate transient solution time, fully or partially explicit methods may be applied to fluid zones that are a subset of the overall zones. In another example, to provide efficient solutions to solid domains with deformation, these zones are discretized using finite element based solutions. The multi-zonal analysis system 104 can be configured to automatically select different solutions methods. Selection of particular discretization methods may influence the algorithmic sequence required to obtain a solution.

In some embodiments, the multi-zonal analysis system 104 can be configured to couple single solution Eulerian solutions with discrete particle tracking. In certain embodiments, the multi-zonal analysis system 104 can be configured to combine multiple Eulerian solutions in the same setup. In some embodiments, the multi-zonal analysis system 104 can be configured to implement coupled Eulerian solutions using Chimera techniques. The multi-zonal analysis system 104 can be configured to perform two-way FSI calculations.

In some embodiments, the multi-zonal analysis system 104 can be configured to vary linear solutions, linear solution matrix storage and linear solutions (algorithms) per zone. In certain embodiments, the multi-zonal analysis system 104 can include interior face zone lists. In addition, the multi-zonal analysis system 104 can be configured to leave for later all cell centered specific data if post processing a Control Volume based Finite Element Model (CV-FEM) solution or if finite elements are solved. The multi-zonal analysis system 104 can be configured to provide each solution choice and each discretization choice with unique topological and meshing requirements.

In some embodiments, the multi-zonal analysis system 104 can be configured to ensure consistency of model and discretization settings within groups of different zones, where the groups are connected via one or more zone interfaces. Global settings may need to be consistent across all groups of connected physical zones, such as transient or steady state analysis settings, or solution method settings (e.g., PBNS, DBNS). Certain zonal settings may need to be consistent within a group of connected physical zones, for example, model settings that include fluid materials (water, air, etc.), turbulence models (e.g., zonal LES) or single phase/multiphase settings, and solution method settings that include DBNS, PBNS; segregated PBNS, and coupled PBNS. Other zonal settings can be changed within each physical zone that is part of a physical zone group connected via interfaces, for example, model settings that include frame rotation or porosity in a fluid zone, or solid material in solid zones, and solution method settings that include an advection scheme, a transient scheme and implicit or explicit relaxation factors. A main difference between the zonal settings that need to be consistent within a group of connected physical zones and the zonal settings that can be changed within each physical zone is related to whether or not appropriate 'interface' models have been implemented.

In certain embodiments, the multi-zonal analysis system 104 can be configured to maintain consistency of the global settings and certain zonal settings within each group of connected zones and derive groups of physics zones that are connected (e.g., via interfaces). The multi-zonal analysis system 104 can be configured to vary models and discretization per zone and expose solution methods into models to vary solution methods per zone. The multi-zonal analysis system 104 may implement certain pressure based solution methods (e.g., SIMPLE, SIMPLEC, PISO, Coupled etc.) and certain density based solution methods (e.g., Explicit, Fully Implicit, etc.). In addition, the multi-zonal analysis system 104 may combine flow models with other models in different ways. For example, energy equations (or species) may be solved segregated from the flow equations with pressure based methods or be solved coupled with the flow equations with density based methods. Turbulence equations may be solved segregated from other equations or be coupled together with other equations (e.g., flow equations). User defined variables may be solved decoupled from other model equations, or be solved coupled together with other equations (e.g., energy equations, flow equations, etc.).

The multi-zonal analysis system 104 may implement default solution method algorithms for activated models, where users may be able to override the default solution method algorithms based on other solution algorithms that are provided with consistent settings. In addition, the multi-zonal analysis system 104 can be configured to iterate (e.g., in a python iterative layer) a particular solution method, then another solution method, and back to the original solution method (e.g., until the solution is converged). Further, the multi-zonal analysis system 104 can be configured to monitor certain quantities, such as residuals, forces, and imbalances, and report these quantities per solution method.

Examples of the different models, solution methods, and parameters that can be selected are provided below in FIGS. 3-7.

Multi-Zonal Fluid Example.

FIG. 3 depicts an example of a multi-zonal physical object. As shown in FIG. 3, the multi-zonal analysis system 104 divides the physical object into four zones R1, R2, R3, and R4 and uses different models, settings, solution methods, parameters to analyze or simulate physical behavior for different zones.

More specifically, R1 and R2 correspond to fluid zones connected by a flow interface. R3 is a solid zone and R4 is a fluid zone with a different material from R1 or R2. The multi-zonal analysis system 104 uses in this example a particular pressure velocity coupling setting and a particular pressure based solution method to simulate or analyze physical behavior of zone R3, and uses different pressure velocity coupling settings and pressure based solution methods for zones R1 and R2. In addition, the multi-zonal analysis system 104 uses turbulence models and equations in zones R1 and R2, and uses a different turbulence model and equation for zone R4. Zone specific settings may be utilized in some embodiments.

Additional Multi-Zonal Fluid Example.

As another example in a multi-zonal fluid dynamics analysis modeling situation, the multi-zonal analysis system 104 can perform zonal Large Eddy Simulation (LES) modeling and Reynolds-Averaged Navier Stokes (RANS) modeling on different zones of the physical object. More specifically, the multi-zonal analysis system 104 can use a LES turbulence model on certain zones that are a subset of the overall group of zones and use a RANS model on every other zone, where overall hydrodynamics and turbulence solution methods are fully implicit in the same sparse matrix. In addition, the multi-zonal analysis system 104 can be configured to run essentially independent models and discretization settings on fluid zones coupled by an energy equation through a solid zone. Moreover, the multi-zonal analysis system 104 can be configured to analyze disconnected fluid zones, such as:

one fluid zone is associated with a compressible flow and another fluid zone associated with an incompressible flow;
one zone associated with a single phase and another zone associated with multiple phases;
one zone associated with a laminar flow and another zone associated with a turbulent flow;
one zone including a mixture of components and another zone including a single component;
one zone associated with a radiation model and another zone being associated with another independent radiation model;
one zone associated with a first order convection and another zone associated with a second order convection.

In certain embodiments, the multi-zonal analysis system 104 can be configured to implement implicit pressure based solution methods (PBNS) that decouple the energy equation from the hydrodynamics and discretize and solve the fluid and solid energy equations in the same sparse matrix. In addition, the multi-zonal analysis system 104 can be configured to implement implicit density based solution methods (DBNS) that couple continuity, momentum and energy equations in fluid zones along with a spatial coupling to a solid zone.

The multi-zonal analysis system 104 can be configured to implement and vary per zone solution methods, such as: a PBNS-Coupled solution method, a PBNS-Segregated solution method, a DBNS-Explicit solution method, a DBNS-Coupled solution method, etc. Furthermore, the multi-zonal analysis system 104 can be configured to implement and vary per zone discretization choices, such as diffusion, convection and gradient discretization, and implement and vary per zone discretization methods, such as Control Volume based Finite Element Volume (CVFEM) and Cell Centered Finite Volume Model (CC-FVM). Moreover, the multi-zonal analysis system 104 can be configured to check consistency of model and discretization settings in a systematic and consistent manner.

The multi-zonal analysis system 104 can be configured to employ a linear solution method infrastructure on a subset of zones to remove a peak storage requirement as for disconnected matrices and solve the disconnected matrices in sequence. In addition, the multi-zonal analysis system 104 can be configured to alter linear solution method strategy or zonal linear solving settings for different solution methods (e.g., a combined discretization and non-linear algorithmic approach) employed in disconnected groups of zones. For example, a density based method is used in one group of zones, and a pressure based method, e.g., pressure based Control Volume based Finite Element Volume (CVFEM) is used in another group of zones.

Multi-Zonal Analysis Example Involving a Multi-Zone Cold Combustor.

The multi-zonal analysis system 104 can be configured for a multi-zone cold combustor. For example, the multi-zonal analysis system 104 is configured to run a cold combustor flow using Reynolds averaged Navier Stokes turbulence modeling in the outer cooling channels and Large Eddy Simulation style model (e.g., SAS, DES etc.) in the inner combustion chamber.

Multi-Zonal Analysis Example Involving a Heat Exchanger.

As another example, the multi-zonal analysis system 104 can be configured for a heat exchanger. For example, the multi-zonal analysis system 104 is configured to couple together fluid zones that have heat transfer models coupled together by a conjugate heat transfer zone. As an example, the multi-zonal analysis system 104 is configured to perform simulations in the coupling of blade cooling passage flows with the main blade passage flow.

The multi-zonal analysis system 104 can be configured to vary models per zone, including multiphase, turbulence, convective heat transfer, radiative heat transfer, user defined variables and particle tracking. Further, the multi-zonal analysis system 104 can be configured to vary discretization of the models per zone. For example, the multi-zonal analysis system 104 is configured to make local discretization choices that provide optimal time to solution for the overall set of coupled models.

Multi-Zonal Analysis Example Involving Laminar Single-Phase Cavity Flow.

Figure 4:
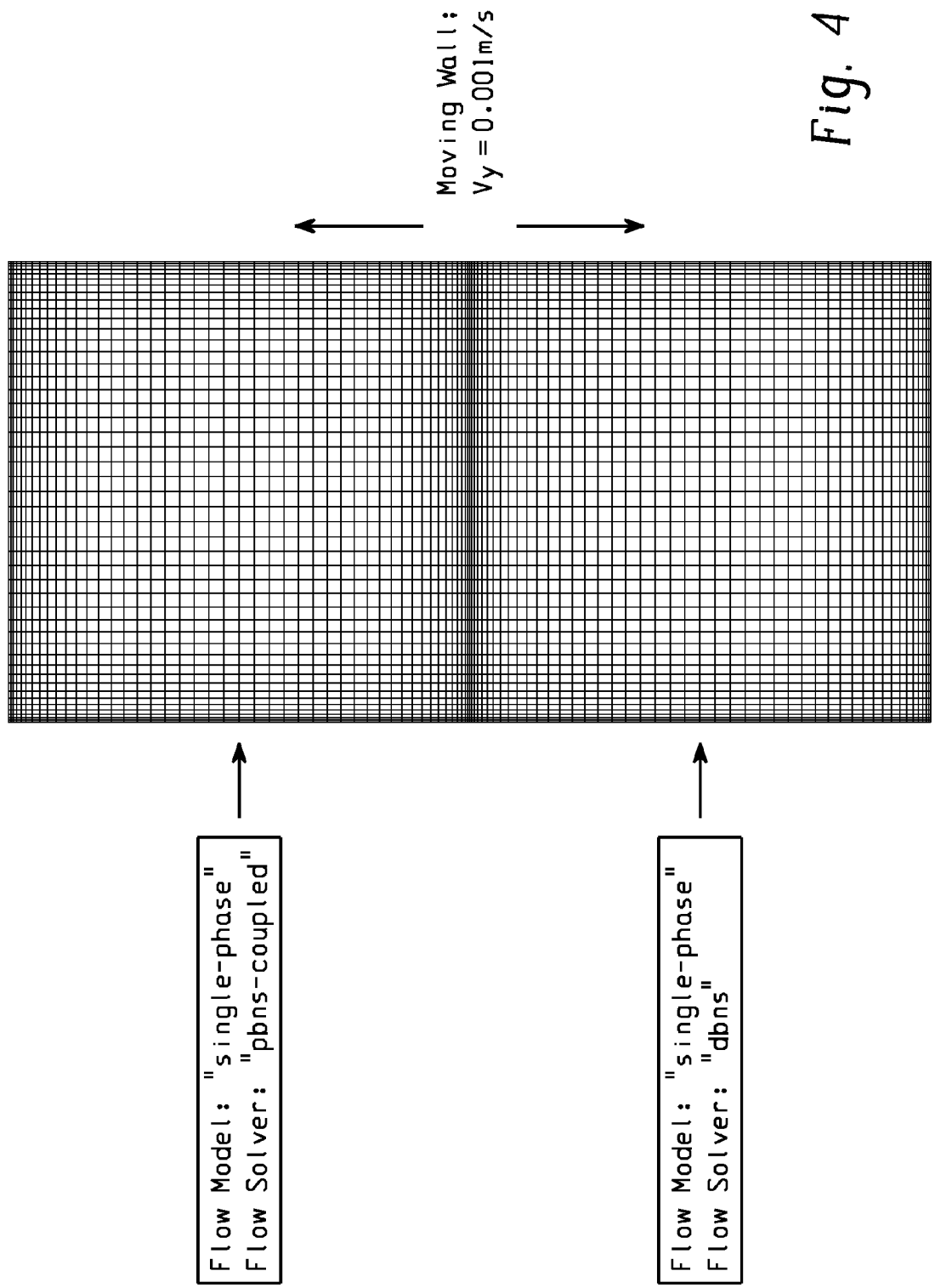
FIG. 4 depicts an example diagram for multi-zonal analysis involving a laminar single-phase cavity flow.

FIG. 4 depicts an example diagram for multi-zonal analysis involving a laminar single-phase cavity flow. As shown in FIG. 4, a moving wall (with a speed of 0.001 m/s) separates a physical object into a top zone and a bottom zone. A flow model "single-phase" and a flow solution method (e.g., solver) "pbns-coupled" are applied to a top zone of a physical object, and the flow model "single-phase" and another flow solution method (e.g., solver) "dbns" are applied to a bottom zone of the physical object.

Multi-Zonal Analysis Example Involving Laminar Single-Phase Cavity Flow With Heat Transfer And Radiation.

Figure 5:
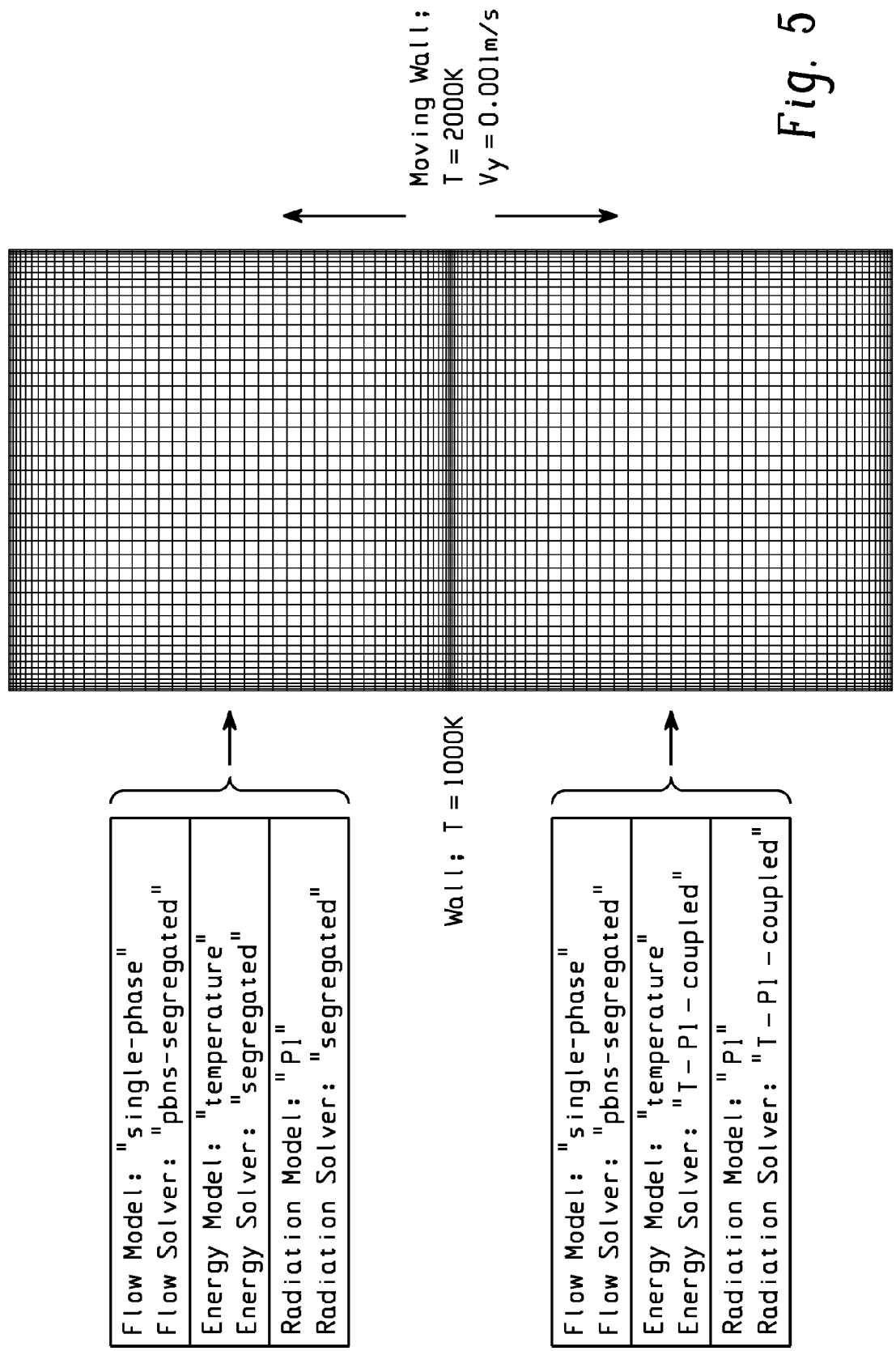
FIG. 5 depicts an example diagram for multi-zonal analysis involving a laminar single-phase cavity flow with heat transfer and radiation.

FIG. 5 depicts an example diagram for multi-zonal analysis involving a laminar single-phase cavity flow with heat transfer and radiation. As shown in FIG. 5, a flow model "single-phase" and a flow solution method (i.e., solver) "pbns-segregated" are applied to both a top zone and a bottom zone of a physical object. In addition, an energy model "temperature," an energy solution method "segregated," a radiation model "P1" and a radiation solution method "segregated" are applied to the top zone. The energy model "temperature," another energy solution method "T-P1-coupled," the radiation model "P1" and another radiation solution method "T-P1-coupled" are applied to the bottom zone.

Multi-Zonal Analysis Example Involving Laminar Single-Phase/Multi-Phase Flow.

Figure 6:
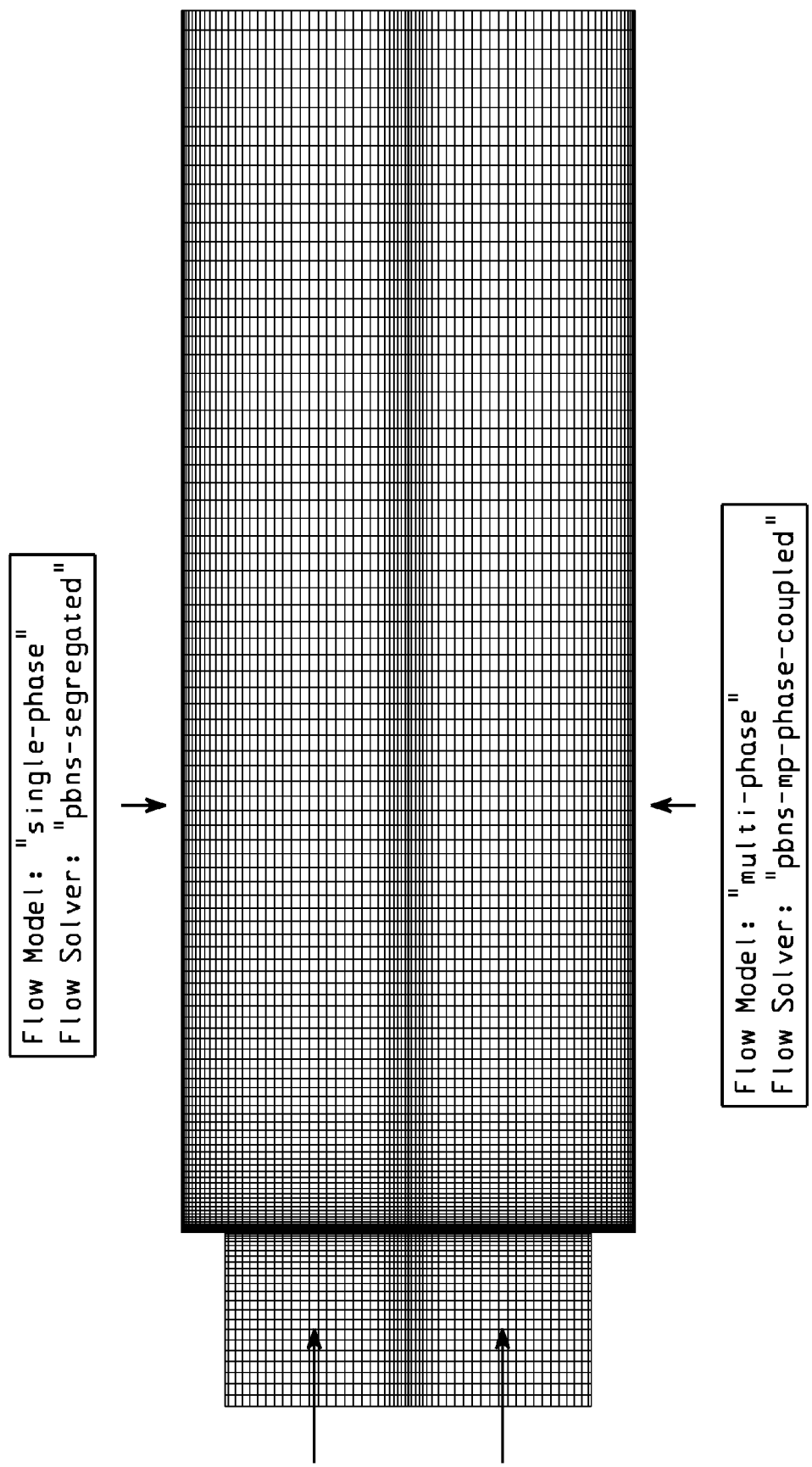
FIG. 6 depicts an example diagram for multi-zonal analysis involving laminar single-phase/multi-phase flow.

FIG. 6 depicts an example diagram for multi-zonal analysis involving laminar single-phase/multi-phase flow. As shown in FIG. 6, a flow model "single-phase" and a flow solution method (e.g., solver) "pbns-segregated" are applied to a top zone of a physical object, and another flow model "multi-phase" and another flow solution method (e.g., solver) "pbns-mp-phase-coupled" are applied to a bottom zone of the physical object.

Multi-Zonal Analysis Involving a Turbulent Single-Phase Flow.

Figure 7:
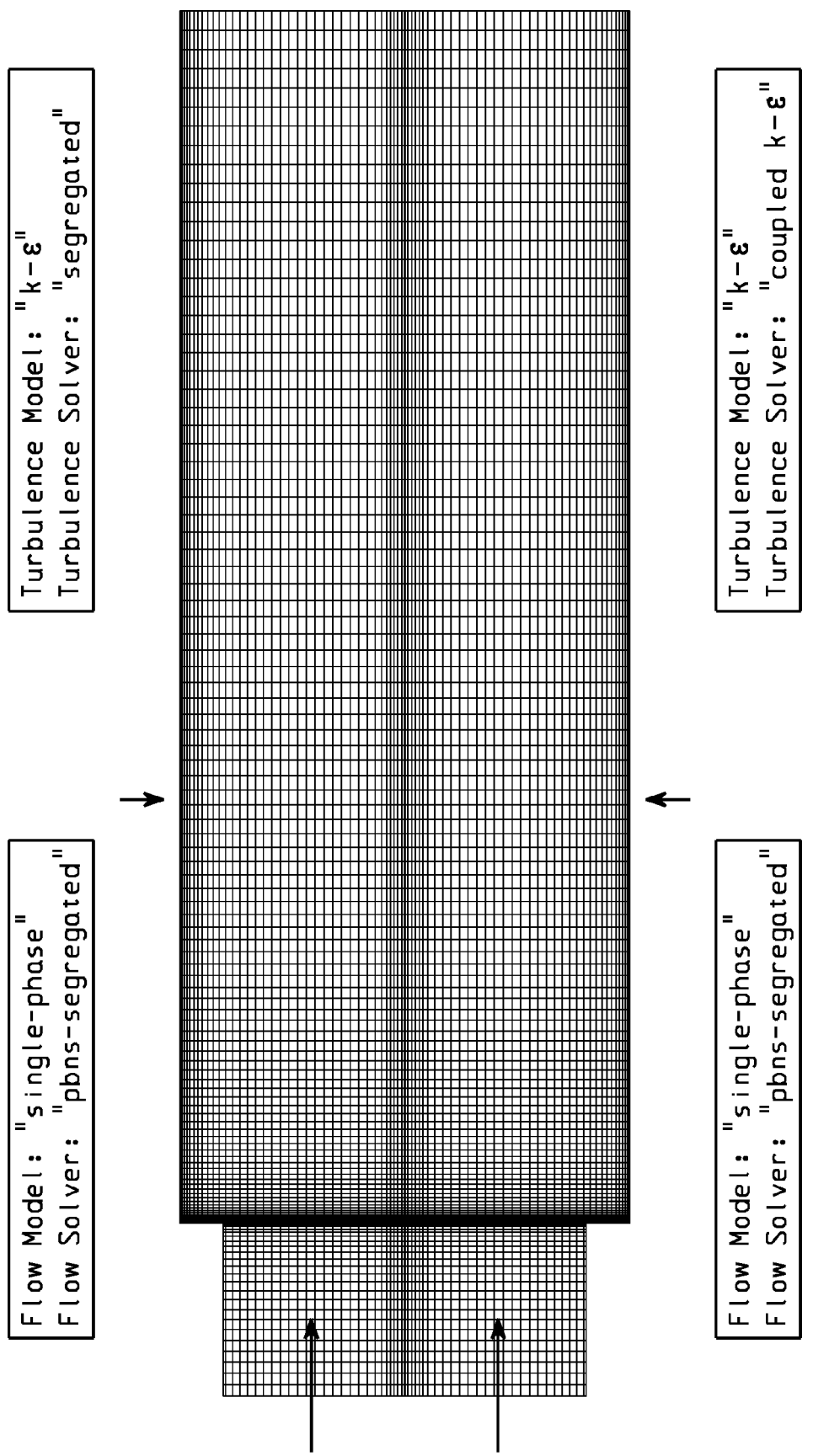
FIG. 7 depicts an example diagram for multi-zonal analysis involving a turbulent single-phase flow.

FIG. 7 depicts an example diagram for multi-zonal analysis involving a turbulent single-phase flow. As shown in FIG. 7, a flow model "single-phase" and a flow solution method (i.e., solver) "pbns-segregated" are applied to both a top zone and a bottom zone of a physical object. In addition, a turbulence model "k-s" and a turbulence solution method "segregated" are applied to the top zone. The turbulence model "k-s" and another turbulence solution method "coupled k-s" are applied to the bottom zone.

Multi-Zonal Architecture Example.

A mid-level architecture can be constructed corresponding to part of codes mainly related to the discretization process and the solution process carried out by the multi-zonal analysis system 104. Models of physical phenomenon (e.g., flow, turbulence and energy) are grouped within a module, and a solution of a physical phenomenon uses the specification of physics (model concept) and solution method for specific model (solution concept) defined per physical phenomenon module. To run a multi-physics solution, a set-up code (e.g., embedded within a defCase function) may need to be executed and may be called only once per execution block. For example, if codes are issued to run for 100 iterations, the set-up code is called once before the first iteration is executed.

Operations for achieving zonal modeling can include the following:

1. Zonal Physics (i.e. model concept)
  Define model per zone for each module
  Define equations per solution
  Define zone lists per equation
  Define integrators per zone for each equation
2. Zonal solution method (i.e. solution concept)
  Define solution per zone
  Define solution commands per solution
  Define sub-solution functions
  Define zone lists per solution Once the above definitions are completed for each new physical model, the zonal modeling functionality can be achieved by the corresponding solution.

Module Setup: defCase( )

The set-up code inside the defCase function is executed per vector that contains an enabled module list. A global module list and the enabled counterparts are set in a function defGlobalSettings and are designed to be dynamic and flexible for controlling the order of execution of individual module set-up. A list of modules and the corresponding execution order are set in defGlobalSettings and are listed below:

modules.push_back("flow");
  modules.push_back("scalar");
  modules.push_back("vector");
  modules.push_back("energy");
  modules.push_back("acoustics");
  modules.push_back("radiation");
  modules.push_back("turbulence");
  modules.push_back("properties");

Several sub-groups of definitional codes within defCase are listed below and operate:

clearStorage*
  defModels*
  defCpldSystems*
  defSolution*
  defIntegrators*

The above definitional codes operate on the enabled module list apart from clear storage that loops over the entire existing module list.

clearStorage*.hpp

A purpose of module specific clearStorage files is memory management of various set-ups in a context of interactive solution, including: memory management of all arrays that have become obsolete due to a model being switched off and memory management of all arrays that have become obsolete due to a model being changed. Memory cleanup of heavy weight data is executed on cell and face levels.

For example, when a flow is de-activated, the flow module memory can be cleaned up as follows:

if (model=="flow-off")
  clearStorageModule(where, module, "storageList");

As shown by the above, clear storage is cleared at a face zone "where" for a given "module" for the list of variables stored in the module storageList. The stoargeList may contain a list of all possible variable names for a given module. If the model is kept active, it can be changed as follows:

else if (model=="flow-sp")
  clearStorageModule(where, module, "incompatibleSpList");

As above, the memory for variables that are incompatible with the active model in a particular zone is cleaned up.

Another role of clearStorage files is to clear module database settings (light weight data).

defModule*.hpp

A purpose of the defModule* files is to execute a set-up code that is highly specific to the module itself, such as in the following manner.

1. Model concept. The model embodies all major physics within a particular module. All physics per zone set up is mainly driven by this concept. The different physics is described by an individual model per module and in particular if different physics implies solution of different transport equations. Each model is represented by a list of equations that are required to be solved. Accordingly, if a new model is introduced this implies that the list of equations will change.

2. Solution concept. The solution concept embodies the solution required to solve a particular physics within given module.

These two concepts are passed to a solution set-up code (defCase*) from a user environment via an AFD data model translation layer. Each module can provide one or more models that are identified by a unique name, represented as a std::string identifier. For example, string identifiers are defined in the AFD data model translation layer for a turbulence module:

modelName=Cond((Flow.Model.isInviscid, "flow-lam"),
    (Turbulence.Model.is Off, "flow-lam"),
    (Turbulence.Model.is SaStd, "sa-std"),
    (Turbulence.Model.is Kele, "kele-std"),
    (Turbulence.Model.is KeStd, "ke-std"), These values are accepted by the turbulence module to control the setup of the model specific data for solving for turbulence. The model value is stored during translation of the AFD data model to each zone in the Database, and is used later by a solution setup.

The current model may be registered per module on a unique zone. Once the model and the solutions are defined per zone, a set-up code with defModule* files may be executed and the execution of the set-up code includes the following:

1. Creation of Equation Lists Per Solution

Each model that is known in a particular zone can be used to create a list of equations that exist on that zone for that model. For example, a P1 model is used to model a case that includes radiation:

radEqList.push_back("p1");

The above specification refers to a zone that corresponds to a cell or face zone. Once the definition of the cell zone model is completed, the definition for the corresponding face zones, can be completed.

2. Creation of a Solution List Per Module

All relevant cell zones are loped and all solutions inside "solutionList" that may occur are registered. For example, for a turbulence module an example may read as follows:

if (solution=="turb-seg")
  addComponent(solutionList, solution);

3. Creation of Module Storage Lists

The storageList and incompatible Lists are created for each module and each model within that module for memory management as specified in the clearStorage explanation.

defCpldSystems*.hpp

Two coupling concepts may be implemented:

1. Arbitrary Equation Coupling

Arbitrary equation coupling includes sub-functionality within a solution as below:

Ability to solve any equation as a part of single coupled matrix;

Ability to provide coupling terms between different members of coupled system

Coupling functions are model dependant.

2. Block Solution Coupling

The block solution coupling enables solving multi-block coupled systems. Each block represents a single solution concept that leads to solution of linear system that contain different matrix sizes. For example, if the solution of a conjugate heat transfer problem is to be coupled in a fluid zone a coupled energy and radiation system (e.g. [T, p1]) is solved. In a solid zone a single scalar energy equation (e.g. [T]) is solved. A following matrix type is returned:

$$\begin{bmatrix} [2 \times 2] & [2 \times 1] \\ [1 \times 2] & [1] \end{bmatrix}$$

In the above matrix, [2×1] and [1×2] represent off diagonal blocks.

The above two concepts are mainly subject of set up conducted in defCpldSystems* files. For arbitrary equation coupling, a coupled equation system is initialized for each solution that is coupled in its nature. For example, for an energy module and a "temp-p1-cpld" solution, the following is used:

```
if (solution == "temp-p1-cpld") {
  // Set coupled equations system
  const int iSysEqns = CPLD_EQNS_SYS_TEMP_P1;
  db.get<IntPair>(pathCpldEqnsPair(solution, "temperature")) =
      std::make_pair(1, iSysEqns);
  initCouplingControl(solution, "temperature");
}
```

Similarly if two solutions are coupled, a set-up code is executed in those functions and the solutions in the block are associated with a unique block id:

```
for (size_t iEq=0; iEq<energyEqList.size( );++iEq)
  setBlockSolution<AType>(solution, energyEqList[iEq], block0);
``` defSolution*.hpp

The purpose of defSolution*.hpp routines is to define and store in the Database all necessary solution definitions that would be needed in order to discretize equations for each model and solution.

1. Creation of Command Vectors.

Creation of solution commands is one of the major aspects of zonal solutions capability. Command solution vectors are filled with high level solution functions that are registered per solution. Those solution command functions determine overall solution workflow. Overall command solution vectors are divided into three sub-groups:

commandsPresolution. This vector defines a list of commands that are necessary to execute prior to assembling and executing linear matrix solution.

commandsSolution. This contains key solution functions that determine all key operations in discretization and linear system solution. Typically these commands functions are solve* type of functions (e.g. solveVelocity).

commandsPostsolution. This contains all commands that need to be executed after linear system solution. Typically these commands would represent old solution data correction or updates based on new solution.

Essentially workflow solution functions that are added to the solution specific are added for a specific module (in this case flow) and stored in Database at a generic path. When a complete workflow is defined by visiting all defSolution*.hpp files, this will be used at a later stage as part of an integrator process.

2. Creation of Equation Solution Functions.

Once commands are created per solution, solution functions are set up for each equation that is a member of a solution equation list for each solution. The equation solution list is determined by defModels* set-up code. For a "pressure" equation:

StringVector&pressureEqList=db.find<StringVector>
  (pathListsDir(module,solution)+"/pressure-
  EqList");

General solution functions are then set up depending whether they are segregated equations or part of a coupled equation system. Different set ups are as follows:

```
for (size_t iEq = 0; iEq < pressureEqList.size( ); ++iEq) {
  const std::string& variable = pressureEqList[iEq];
  if (solution == "pbns-cpld") // Coupled solution
    setSolutionCpld<AType>(solution, variable, variable);
  else // Segregated solution
    setSolutionSeg<AType>(solution, variable, variable);
``` setSolution* functions are responsible for setting up all main functions for main operations of the equation discretization which include: linear solution, relaxation, integrators, etc.

3. Creation of Coupling Terms Equation Solution

For a coupled system, a system is created with system members (e.g., equation names) and associated unique indices for the equations within the coupled system.

A coupled system "EqCpld" is created to associate each member of a radiation equation list "radEqList" with unique indice inside a coupled system "iCpld." Coupling terms are created inside a coupled matrix to enhance convergence and therefore benefit user by choosing coupled equations. Each member of the coupled system is associated with the list of equations with associated coupling terms:

db.get<StringStringVectorMap>("EqCpldWith") ["p1"]=radEqCpldList;

The equation "p1" has coupling terms with the equations listed in vector radEqCpldList.

defIntegrator*.hpp

After the model definition and the solution definition are completed, integrator functions are defined in defIntegrator*.hpp functions where integrator (i.e. discretization) functions necessary to discretize particular equation in each zone are defined and stored in databases. A set-up code inside defIntegrator* functions is executed on both cell and face zones reflecting discretization nature of FV methods. An example of such set up on cell zones includes:

```
for (StringVector::const_iterator z = cellZones.begin( );
        z != cellZones.end( ); ++z) {
    std::string where = *z;
    std::string model = db.find<std::string>(pathModel(module, where));
    if (model == "flow-sp") {
        std::string variable = "velocity";
        setSolutionZonesCell(solution, where, variable);
        setIntegratorsCellVelocity<AType>(solution, where, variable);
        setRecipesVelocity<AType>(where, variable, type);
```

1. setSolutionZonesCell

This function is responsible for setting a list of zones on which a given variable that belongs to a particular solution operates on:

db.get<StringVector>(pathCellZones(solution, what)). push_back(where);

2. setIntegratorsCellVelocity

This function is to set up integrator functions on a cell level for a velocity equation. All integrator functions are referred to as "rates" as below:

RateVector& vRates=db.get<RateVector>(pathRates (variable, where));
vRates.push_back
(asmMomentumPressureGradient<AType>);

3. setRecipesVelocity

The recipe functions are also utilized within discretization functions and can be set up on each zone for each variable on the zone. An example set-up code is given below:

db.get<RecipeFcn>(recipeDir+"-0")=normalIn-DirectionRecipe<AType>;

An integrator function is responsible for creating a sparse matrix and visiting every face and cell zone that are active for the particular variable. For every face zone, the integrator function looks up a vector of previously stored rate function pointers and calls the pointers, where each rate function adds contribution to the sparse matrix and source vector. For every cell zone, the integrator function looks up a vector of previously stored source function pointers and calls the pointers, where the source is added to the source vector and the derivative with respect to the solved variables to the sparse matrix.

A rate and a source function pointers are stored in the database in a model's defIntegrator*.hpp file. After the rate and the source functions are put into the database, the integrator can be called:

integrator<AType>(variable);

Using the integrator avoids using large switch/case statements and keeps the model logic, which gets implemented in the defIntegrator*.hpp files, separate from the discretization code to render adding a new boundary condition type easy.

Using the integrator also avoids loops over zones. The rate and the source functions are specified for each required zone before the integrator is called.

A solution of a model are related to a number of operations that are specific to that model. For example, when gradients get calculated needs to be explicitly specifies. There may be special operations involved in the model, such as correcting pressure and velocity and updating the mass imbalance as occurs in the SIMPLE flow solution algorithm. These operations are put into a function and the function is then stored in an array of commands that get executed in the order registered in every solution iteration.

Rate functions are provided for the discretization of advection and diffusion terms, with specialized codes for the solution of both a scalar variable and a vector variable. These rates create a linear system of equations to be stored in a segregated matrix or a coupled matrix depending whether a particular equation is part of a coupled system or a segregated system.

The computeGradient(what) function is provided for the calculation of cell center gradients. When the computeGradient(what) function is called, it visits each face zone which is active for the specified variable and calls the accumulation functions which were previously stored in the database. The gradient algorithm function can use the cell based Green-Gauss method or the cell based least squares method. Functions related to these methods are stored in the ggcb and lscb namespaces. The particular method is determined by the function pointer stored in the "/gradient-function" field in the database, either ggcb::computeGradient(what), or lscb::computeGradient(what).

For the Green-Gauss method, the accumulation functions compute the face value of the variable and add the face's contribution to the gradient. Several generic accumulators are provided for this purpose. The ggcb::arithmeticAvgAccumulator and ggcb::harmonicAvgAccumulator compute the face value using arithmetic or harmonic averaging. The ggcb::zeroAccumulator adds the effect of a zero boundary value, such as the pressure correction at a specified static pressure boundary. The ggcb::dirichletAccumulator assumes that either the variable is stored on the boundary or a recipe function has been provided for its calculation. The face value on the boundary is looked up. The ggcb::neumannAccumulator uses the value of the variable in the neighboring cell as the face value. The accumulator function pointers are stored in the "/{where}/accumulate/ggcb/{what}" field in the database.

For a least squares method, the accumulation functions add the effect of the neighbor cell for interior face zones or the boundary face value for boundary face zones to the normal system of equations for the cell. Several generic accumulators are provided for this purpose. The lscb::interiorAccumulator, lscb::dirichletAccumulator, and lscb::neumannAccumulator add the effect of interior faces, Dirichlet boundary faces, or Neumann boundary faces. The accumulator function pointers are stored in the "/{where}/accumulate/lscb/{what}" field in the database. The accumulation functions may not allocate storage for the variable on face zones, and add the effect of the computed face value to the gradient. An accumulation function can be specified for all active face zones for the specified variable.

Figure 8:
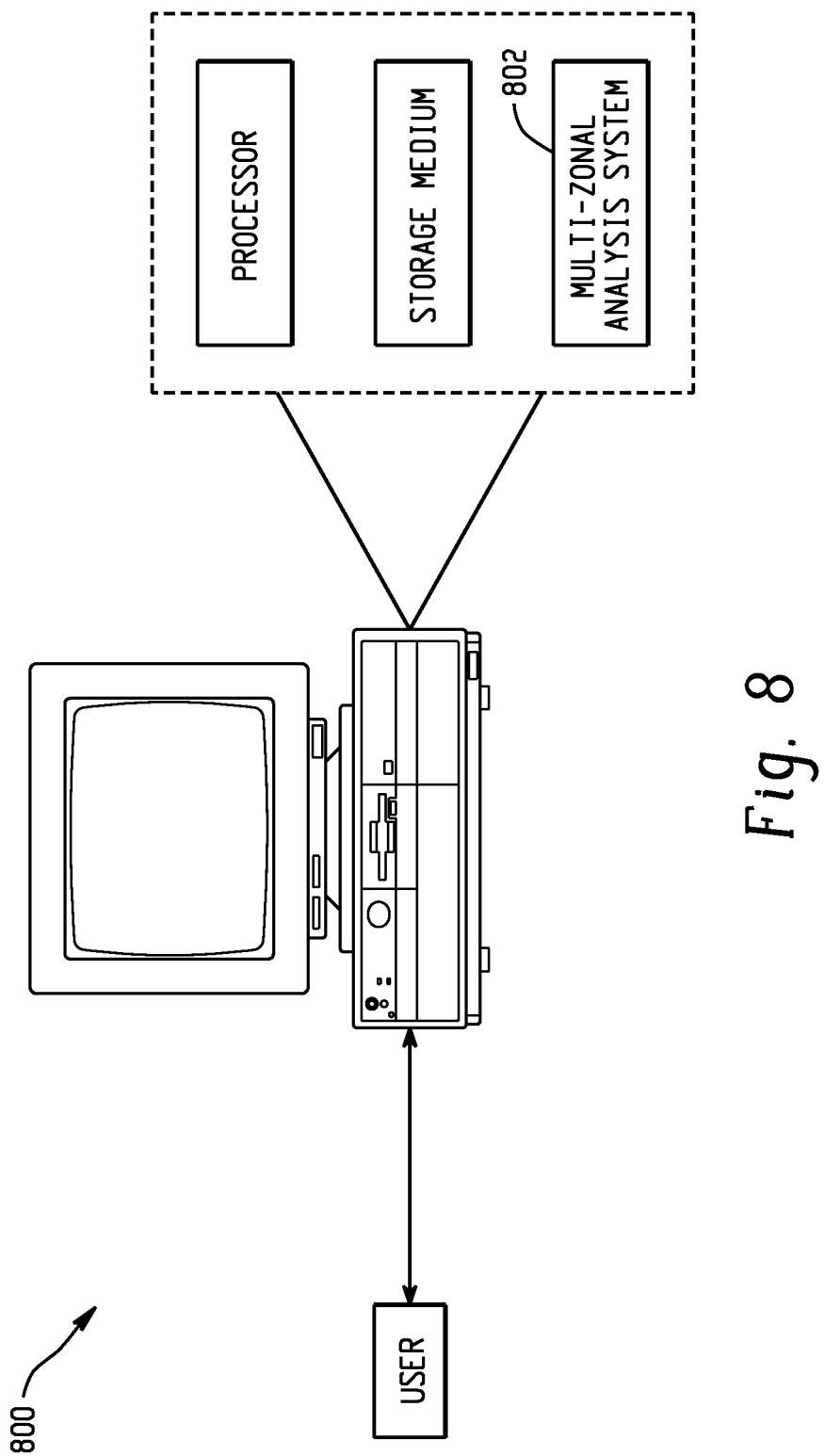
FIG. 8 depicts a multi-zonal analysis system provided on a stand-alone computer for access by a user.

This written description uses examples to disclose the invention, including the best mode, and also to enable a person skilled in the art to make and use the invention. The patentable scope of the invention may include other examples. For example, a computer-implemented system and method can be configured to provide unique capabilities not otherwise available in existing computational fluid dynamic and other engineering computer-aided simulation software products currently available on the market. As an example, a computer-implemented system and method can be configured to allow for any choice of model, solution or discretization per zone of the fluid or solid field to be simulated or analyzed. For example, a computer-implemented system and method can be configured to utilize a solution algorithm or algorithms that is or are applied to provide a solution or solutions to the physical models setup on a particular problem. In some embodiments, a geometric model of a solid object and/or the zone to be simulated or analyzed may be generated and a computational mesh of the zone to be modeled generated to help facilitate the simulation and solution. Objects of many types can be analyzed, such as any physical object that can be depicted on a computer screen for analysis. As another example, a computer-implemented system and method can be configured such that a multi-zonal analysis system 802 can be provided on a stand-alone computer for access by a user, such as shown at 800 in FIG. 8.

As another example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of non-transitory computer-readable storage medium that is stored at a single location or distributed across multiple locations. The medium can include computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A multi-zonal analysis processor-implemented system for analyzing physical behavior of a multi-zonal physical object, said system comprising:
   a non-transitory computer-readable storage medium configured to store candidate multi-zonal engineering models, solution methods, and parameters associated with the engineering models and solution methods;
   wherein the multi-zonal physical object is divided into multiple zones based upon a common physical characteristic; and
   one or more data processors configured to:
      provide the stored candidate multi-zonal engineering models, solution methods, and associated parameters for selection and use in analyzing any of the zones with respect to the physical behavior of the multi-zonal physical object;
      generate physical result data for the zones using the selected models, solution methods, and associated parameters; and
      store the generated physical result data for use in analyzing the physical behavior of the multi-zonal physical object.

2. The system of claim 1, wherein the candidate models, solution methods, and the associated parameters that are provided for selection allow for any choice of the models, solution methods, or associated parameters per zone of the multi-zonal physical object to be simulated or analyzed.

3. The system of claim 2, wherein the allowing for any choice of the models facilitates the varying of models per zone.

4. The system of claim 2, wherein the allowing for any choice of solution methods facilitates the varying of solution methods per zone.

5. The system of claim 4, wherein the varying of the solution methods per zone includes applying fully or partially explicit methods to fluid zones that are a subset of the overall zones.

6. The system of claim 4, wherein the varying of the solution methods per zone includes selecting a linear solution method or a non-linear solution method on a per zone basis.

7. The system of claim 4, wherein the varying of the solution methods per zone includes varying discretization methods per zone.

8. The system of claim 7, wherein the varying of the discretization methods includes varying gradient methods per zone.

9. The system of claim 7, wherein the varying of the discretization methods includes varying relaxation methods per zone.

10. The system of claim 7, wherein the varying of the discretization methods includes varying discretization of convection, diffusion, and other surface-based flux terms in each solved equation on a per zone basis.

11. The system of claim 7, wherein the varying of the discretization methods includes varying spatial discretization schemes.

12. The system of claim 1, wherein the analyzing of the physical behavior includes fluid dynamic analysis of the multi-zonal physical object.

13. The system of claim 12, wherein the candidate engineering models include multiphase and turbulence models.

14. The system of claim 1, wherein the analyzing of the physical behavior includes heat transfer analysis of the multi-zonal physical object.

15. The system of claim 14, wherein the candidate engineering models include convective heat transfer models, radiative heat transfer models, and conductive heat transfer models.

16. The system of claim 1, wherein the candidate engineering models include one or more geometric models of a solid object to be simulated or analyzed; wherein computational meshes are generated of the multi-zonal physical object to be modeled.

17. The system of claim 1, wherein the one or more data processors are configured to check consistency of model and discretization settings across the multiple zones.

18. The system of claim 17, wherein global settings are used for consistency checking across all groups of connected zones.

19. The system of claim 18, wherein additional settings are used for consistency checking within a group of connected zones.

20. The system of claim 1 further comprising a graphical user interface for allowing selection of the candidate solution methods and associated parameters.

21. The system of claim 1, wherein the configuration file contains which of the candidate solution methods and associated parameters are to be used in the analyzing of any of the zones with respect to the common physical characteristics.

22. The system of claim 1, wherein the non-transitory computer-readable storage medium includes storage devices for storing the candidate solution methods and associated parameters.

23. The system of claim 1, wherein the non-transitory computer-readable storage medium includes volatile memory, non-volatile memory, and combinations thereof for storing the candidate solution methods and associated parameters.

24. The system of claim 1, wherein selection of one of the candidate models automatically selects one or more multi-zonal solution methods and parameters for use in analyzing one of the zones.

25. A multi-zonal analysis processor-implemented method for analyzing physical behavior of a multi-zonal physical object, said method comprising:
storing in a non-transitory computer-readable storage medium candidate multi-zonal engineering models, solution methods, and parameters associated with the engineering models and solution methods;
wherein the multi-zonal physical object is divided into multiple zones based upon a common physical characteristic;
providing, by one or more data processors, the stored candidate multi-zonal engineering models, solution methods, and associated parameters for selection and use in analyzing any of the zones with respect to the physical behavior of the multi-zonal physical object;
generating, by one or more data processors, physical result data for the zones using the selected models, solution methods, and associated parameters; and
storing, by one or more data processors, the generated physical result data for use in analyzing the physical behavior of the multi-zonal physical object.

26. The method of claim 25, wherein the candidate models, solution methods, and the associated parameters that are provided for selection allow for any choice of the models, solution methods, or associated parameters per zone of the multi-zonal physical object to be simulated or analyzed.

27. The method of claim 26, wherein the allowing for any choice of the models facilitates the varying of models per zone.

28. The method of claim 26, wherein the allowing for any choice of solution methods facilitates the varying of solution methods per zone.

29. The method of claim 28, wherein the varying of the solution methods per zone includes applying fully or partially explicit methods to fluid zones that are a subset of the overall zones.

30. The method of claim 28, wherein the varying of the solution methods per zone includes selecting a linear solution method or a non-linear solution method on a per zone basis.

31. The method of claim 28, wherein the varying of the solution methods per zone includes varying discretization methods per zone.

32. The method of claim 31, wherein the varying of the discretization methods includes varying gradient methods per zone.

33. The method of claim 31, wherein the varying of the discretization methods includes varying relaxation methods per zone.

34. The method of claim 31, wherein the varying of the discretization methods includes varying discretization of convection, diffusion, and other surface-based flux terms in each solved equation on a per zone basis.

35. The method of claim 31, wherein the varying of the discretization methods includes varying spatial discretization schemes.

36. The method of claim 25, wherein the analyzing of the physical behavior includes fluid dynamic analysis of the multi-zonal physical object.

37. The method of claim 36, wherein the candidate engineering models include multiphase and turbulence models.

38. The method of claim 25, wherein the analyzing of the physical behavior includes heat transfer analysis of the multi-zonal physical object.

39. The method of claim 38, wherein the candidate engineering models include convective heat transfer models, radiative heat transfer models, and conductive heat transfer models.

40. The method of claim 25, wherein the candidate engineering models include one or more geometric models of a solid object to be simulated or analyzed; wherein computational meshes are generated of the multi-zonal physical object to be modeled.

41. The method of claim 25, wherein the method further comprises check consistency of model and discretization settings across the multiple zones.

42. The method of claim 41, wherein global settings are used for consistency checking across all groups of connected zones.

43. The method of claim 42, wherein additional settings are used for consistency checking within a group of connected zones.

44. The method of claim 25, wherein the method further comprises providing a graphical user interface for allowing selection of the candidate solution methods and associated parameters.

45. The method of claim 25, wherein the configuration file contains which of the candidate solution methods and associated parameters are to be used in the analyzing of any of the zones with respect to the common physical characteristics.

46. The method of claim 25, wherein the non-transitory computer-readable storage medium includes storage devices for storing the candidate solution methods and associated parameters.

47. The method of claim 25, wherein the non-transitory computer-readable storage medium includes volatile memory, non-volatile memory, and combinations thereof for storing the candidate solution methods and associated parameters.

48. The method of claim 25, wherein selection of one of the candidate models automatically selects one or more multi-zonal solution methods and parameters for use in analyzing one of the zones.

49. A machine-readable non-transitory medium having stored data representing sets of instructions which, when executed by a machine, cause the machine to:
store in a non-transitory computer-readable storage medium candidate multi-zonal engineering models, solution methods, and parameters associated with the engineering models and solution methods;
wherein the multi-zonal physical object is divided into multiple zones based upon a common physical characteristic;
provide, by one or more data processors, the stored candidate multi-zonal engineering models, solution methods, and associated parameters for selection and use in analyzing any of the zones with respect to the physical behavior of the multi-zonal physical object;
generate, by one or more data processors, physical result data for the zones using the selected models, solution methods, and associated parameters; and
store, by one or more data processors, the generated physical result data for use in analyzing the physical behavior of the multi-zonal physical object.

50. The medium of claim 49, wherein the candidate models, solution methods, and the associated parameters that are provided for selection allow for any choice of the models, solution methods, or associated parameters per zone of the multi-zonal physical object to be simulated or analyzed.

51. The medium of claim 50, wherein the allowing for any choice of the models facilitates the varying of models per zone.

52. The medium of claim 50, wherein the allowing for any choice of solution methods facilitates the varying of solution methods per zone.

53. The medium of claim 52, wherein the varying of the solution methods per zone includes applying fully or partially explicit methods to fluid zones that are a subset of the overall zones.

54. The medium of claim 52, wherein the varying of the solution methods per zone includes selecting a linear solution method or a non-linear solution method on a per zone basis.

55. The medium of claim 52, wherein the varying of the solution methods per zone includes varying discretization methods per zone.

56. The medium of claim 55, wherein the varying of the discretization methods includes varying gradient methods per zone.

57. The medium of claim 55, wherein the varying of the discretization methods includes varying relaxation methods per zone.

58. The medium of claim 55, wherein the varying of the discretization methods includes varying discretization of convection, diffusion, and other surface-based flux terms in each solved equation on a per zone basis.

59. The medium of claim 55, wherein the varying of the discretization methods includes varying spatial discretization schemes.

60. The medium of claim 49, wherein the analyzing of the physical behavior includes fluid dynamic analysis of the multi-zonal physical object.

61. The medium of claim 60, wherein the candidate engineering models include multiphase and turbulence models.

62. The medium of claim 49, wherein the analyzing of the physical behavior includes heat transfer analysis of the multi-zonal physical object.

63. The medium of claim 62, wherein the candidate engineering models include convective heat transfer models, radiative heat transfer models, and conductive heat transfer models.

64. The medium of claim 49, wherein the candidate engineering models include one or more geometric models of a solid object to be simulated or analyzed; wherein computational meshes are generated of the multi-zonal physical object to be modeled.

65. The medium of claim 49, wherein the machine is caused to to check consistency of model and discretization settings across the multiple zones.

66. The medium of claim 65, wherein global settings are used for consistency checking across all groups of connected zones.

67. The medium of claim 66, wherein additional settings are used for consistency checking within a group of connected zones.

68. The medium of claim 49, wherein the machine is caused to provide a graphical user interface for allowing selection of the candidate solution methods and associated parameters.

69. The medium of claim 49, wherein the configuration file contains which of the candidate solution methods and associated parameters are to be used in the analyzing of any of the zones with respect to the common physical characteristics.

70. The medium of claim 49, wherein the non-transitory computer-readable storage medium includes storage devices for storing the candidate solution methods and associated parameters.

71. The medium of claim 49, wherein the non-transitory computer-readable storage medium includes volatile memory, non-volatile memory, and combinations thereof for storing the candidate solution methods and associated parameters.

72. The medium of claim 49, wherein selection of one of the candidate models automatically selects one or more multi-zonal solution methods and parameters for use in analyzing one of the zones.

* * * * *